United States Patent [19]

Rumland

[11] Patent Number: 4,484,216
[45] Date of Patent: Nov. 20, 1984

[54] METHOD AND CIRCUIT FOR DYNAMIC CROSS COLOR SUPPRESSION IN COLOR TELEVISION SET

[75] Inventor: Rainer Rumland, Rosstal, Fed. Rep. of Germany

[73] Assignee: Grundig E. M. V., Fuerth/Bay, Fed. Rep. of Germany

[21] Appl. No.: 377,975

[22] Filed: May 13, 1982

[30] Foreign Application Priority Data

May 16, 1981 [DE] Fed. Rep. of Germany ....... 3119653

[51] Int. Cl.³ .......................................... H04N 9/535
[52] U.S. Cl. ...................................... 358/39; 358/37
[58] Field of Search .................. 358/21 R, 31, 39, 37, 358/38

[56] References Cited

U.S. PATENT DOCUMENTS 4,149,181 4/1979 Burdick ................................ 358/39
4,167,021 9/1979 Holmes ................................ 358/39
4,276,566 6/1981 Parker ................................. 358/39

Primary Examiner—Michael A. Masinick
Attorney, Agent, or Firm—Kane, Dalsimer, Kane Sullivan and Kurucz

[57] ABSTRACT

A method and circuit for a dynamic suppression of cross color, preferably in the coders of color interference television sets, wherein the signal band width of the luminance signal within the range of the color carrier is reduced depending upon a generated control signal. The control signal is generated by an oscillator within defined conditions for oscillation corresponding to the color carrier frequency range, and coupled with a rectifying circuit provides a signal to an FET controlling the operation of the circuit and the suppression of the cross color interference. The control signal is generated only when in the luminance signal frequency occurs in the range of the color carrier, but not when present if only individual peak or reduction flanks are present in the luminance signal.

3 Claims, 1 Drawing Figure

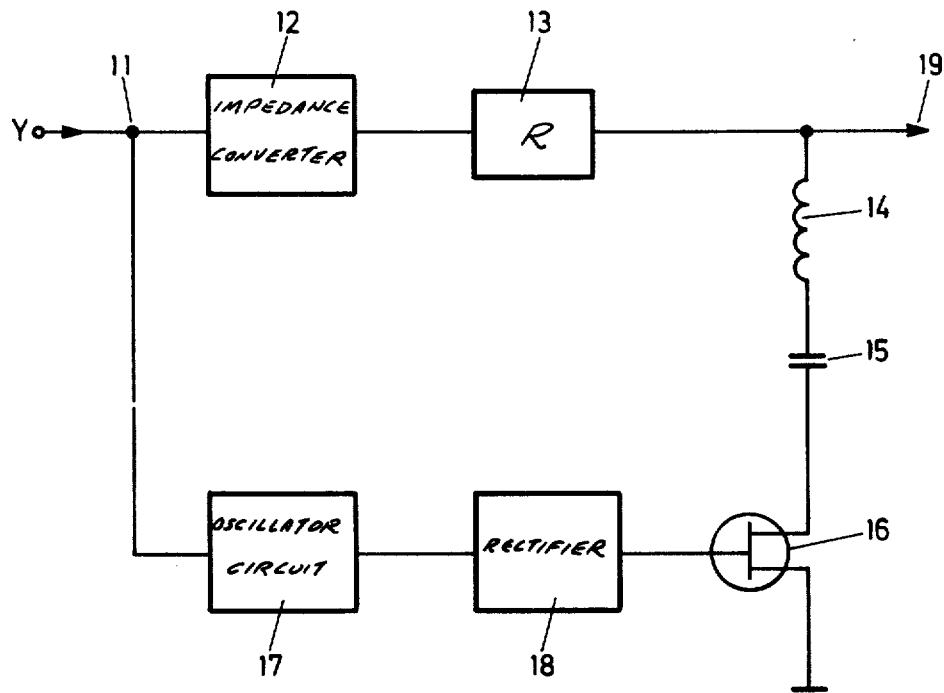

METHOD AND CIRCUIT FOR DYNAMIC CROSS COLOR SUPPRESSION IN COLOR TELEVISION SET

FIELD OF THE INVENTION

The present invention is directed towards a method and circuit for cross color suppression, particularly in the coder of color television.

BACKGROUND OF THE INVENTION

In television recording by way of a color camera or color film scanning, there have been numerous improvements in an attempt to obtain clearer and more sharply defined picture. What has resulted however is cross color interference particularly in the operating range of conventional color television signal coding such as that provided by NTSC and PAL, for example. Cross color is interference in a color television's receiver chrominance channel caused by cross talk from the monochrome signals. In other words the black and white information crosses over into the frequency range of the color channels, which results in, for example, striped or fine patterned movable video surfaces particularly flat surfaces (i.e., suits and ties of actors etc), causing an undesirable color appearance.

In an attempt to eliminate such interference, a band elimination filter in the band carrier range or a corresponding low pass filter in the luminance (brightness) channel of the coders of the video color cameras has been heretofore utilized however a problem with such an arrangement is that it permanently deteriorates the video picture.

Another improvement to the video quality involved suppressing the amplitude of the interfering luminance components as described in German Patent Ser. No. DE-AS 2411296. To accomplish this, the luminance signal is fed to a time delay member or circuit as well as a band pass filter. The output signal of the band pass filter is then subtracted from the output signal of the time delay circuit to provide for the appropriate suppression.

In order to partially correct the deterioration of the video picture caused thereby, the output signal of the band pass filter is further limited and added to the output signal. However, the color video signal is not sufficient with respect to sharpness or with respect to the interference suppression. In addition, it might be noted that such a device operates not only with respect to, for example, flat appearing objects in the picture which generate frequencies in the color carrier range of the luminance signal, but also affects steep picture transmission (steep signal rise or drop, i.e. black-white jump) and thereby reduces the steepness in the signal rise, thereby having an undesirous effect on the picture.

Regarding the use of SECAM color signal coders, there is described in German Pat. No. DE-OS 14 37 744 a means to control the amplitude and phase of the color carrier depending on the cross color error to be expected. However, this results in only a portion of the cross color interference being suppressed. Further, this principle can not possible be used with PAL coders.

There is presently known a circuit for detecting and if necessary suppressing cross over interferences from the luminance (brightness) channel into the color channel of a color video transmission device as for example that described in German Pat. No. DE-AS 28 21 183. In this device there is provided a time delay member or circuit and a luminance filter which is switchable by means of the control signal into the luminance channel. For storing a video line, there is provided a series circuit fed with the luminance signal consisting of a band pass filter synchronized to the color carrier. An integrator is provided which is synchronized to the width of the picture element of the signal source with the time delay circuit storing a video field. A logic member is provided and arranged in such a manner that the logic member only switches through when it is over a predetermined amount (N) of successive lines of the luminance signal when color carrier frequency luminance portions are present. In the switched through condition, the output signal of the logic member represents the control signal, which if necessary, controls a reverse switch for switching on the filter. Alternatively, the logic member switches the time delay member to the luminance channel.

However, this circuit suffers the disadvantages that aside from being relatively complicated and expensive, over a plurality of video fields a determination is made whether cross color conditions are present, and if present limits the luminance signal in the band width for the total picture and not just for parts of the picture where the cross colors appear.

Accordingly, a need exists for a relatively simple yet effective means to control cross color which is relatively inexpensive and avoids the disadvantages of the circuits aforenoted.

SUMMARY OF THE INVENTION

It is an object of the invention to provide for a circuit and method which is relatively simple, yet effective in suppressing cross color interference in television reception.

It is a further object to provide for a circuit which allows the generation of frequencies in the video signal range of the color carrier only in flat structures displayed and effects a limitation of the luminance signal for the time in which the interference is present.

These and other objects and advantages will be realized by the present invention which provides for the dynamic suppression of cross color, preferably in coders of color television sets. In this regard in the video signal band width, the luminance signal within the range of the color carrier is reduced, based upon a control signal. The control signal is only present when in the luminance signal frequencies occur in the range of the color carrier, and is not present when individual peak or of reduction flanks are present in the luminance signal. The control signal is generated by an oscillator or resonant circuit with a defined condition for oscillation in conjunction with a rectifying circuit.

BRIEF DESCRIPTION OF THE DRAWING

The objects and advantages aforenoted, and others are realized by the present invention, the description of which should be taken in conjunction with the drawing wherein:

FIG. 1 is a block diagram, partially schematic representation of the circuit incorporating the teachings of the present invention.

DETAILED DESCRIPTION OF THE PREFERRED EMBODIMENT

With reference to the FIGURE, a signal circuit is depicted preferably for use in the coder or a color television camera. In this regard, the luminance signal (Y) is fed through an input 11 of the signal circuit to an impedance converter 12 providing a relative low ohm signal output. The resistor 13 i.e., in the order of about 100 ohm, forms a voltage divider circuit with an inductor 14, a capacitor 15 and a field effect transistor (FET) 16. A pick off output 19 is the output of the voltage divider and thereby the signal of the circuit.

The output of the resistor 13 is connected to ground through the series circuit of the inductor 14, capacitor 15 and the FET 16. The inductor 14 and capacitor 15 together form a filter for the color carrier frequency.

The luminance signal Y is also coupled to an oscillator or resonant circuit 17 which is synchronized to the color carrier frequency. Accordingly, as soon as the frequency of luminance signal Y occurs in the color carrier range, the oscillator 17 is excited.

The output of the oscillator 17 is rectified by rectifier 18 which operates a control voltage which controls the operation of the FET 16 which depends on the output amplitude of the control voltage. In effect, the FET 16 therefore operates as a controlled resistor which regulates the voltage divider ratio and accordingly the output 19.

The voltage divider circuit consisting of resistor 13, inductor 14, capacitor 15 and FET 16 provides an output 19 which is a variable fraction of the voltage applied to it. The high frequencies of the luminance signal Y in the range of the color carrier are suppressed at the output 19 of the signal circuit.

In order for the oscillator 17 to respond and generate a control voltage, this requires preferably 1 to 1½ oscillations of a frequency in the color carrier range of the luminance signal. Thus, in normal transmissions of the picture signal where an irregular sequence in a natural scene may occur, the circuit advantageously does not respond. Consequently, the luminance channel operates with the full band width in the control situation. The circuit responds in the case when structures in the picture, indicated by their frequency, are present in the range of the color carrier, but only for the small partial segment of the picture which contains the interfering structure.

Thus the present invention provides for a simple yet effective way of suppressing cross color interference. Although a preferred embodiment has been disclosed and described in detail herein, its scope should not be limited thereby, rather its scope should be determined by that of the appended claims.

What is claimed is:

1. A suppression circuit for suppressing cross color interference created by luminance signals in the frequency range of color carrier signals, said suppression circuit comprising: a resonant circuit; a voltage divider circuit; and a variable resistor in said voltage divider circuit responsive to a control signal from said resonant circuit; whereby said resonant circuit generates the control signal controlling the operation of the variable resistor in the voltage divider circuit so as to suppress luminance signals that are in the color carrier frequency range.

2. The circuit in accordance with claim 1 which further includes a rectifier coupled with the resonant circuit for controlling the variable resistor.

3. The circuit in accordance with claim 2 wherein said variable resistor is a field effect transistor (FET).

* * * * *